United States Patent [19]
Bengtson et al.

[11] Patent Number: 5,254,251
[45] Date of Patent: Oct. 19, 1993

[54] MEMBRANE FOR THE SEPARATION OF LIQUID MIXTURES BY PERVAPORATION

[75] Inventors: Gisela Bengtson, Hamburg; Karl W. Böddeker, Breitenfelde, both of Fed. Rep. of Germany

[73] Assignee: GKSS- Forschungszentrum Geesthacht GmbH, Geesthacht, Fed. Rep. of Germany

[21] Appl. No.: 820,699

[22] PCT Filed: Jul. 11, 1990

[86] PCT No.: PCT/DE90/00520

§ 371 Date: Mar. 23, 1992

§ 102(e) Date: Mar. 23, 1992

[87] PCT Pub. No.: WO91/01176

PCT Pub. Date: Feb. 7, 1991

[30] Foreign Application Priority Data

Jul. 25, 1989 [DE] Fed. Rep. of Germany ....... 3924501

[51] Int. Cl.⁵ .............................................. B01D 15/00
[52] U.S. Cl. .................................. 210/490; 210/500.1; 210/500.23; 210/500.27; 428/297
[58] Field of Search ............... 210/490, 500.1, 500.23, 210/500.27, 488, 640, 650, 195.2; 428/286, 297; 55/16, 158

[56] References Cited

U.S. PATENT DOCUMENTS

| | | | |
|---|---|---|---|
| 2,944,017 | 7/1960 | Cotton | 210/500.1 |
| 3,563,889 | 2/1971 | Cooper, IV et al. | 210/490 |
| 3,720,321 | 3/1973 | Coughlin et al. | 210/650 |
| 3,770,567 | 12/1977 | Gustavcrot | 428/286 |
| 4,061,821 | 12/1977 | Hayano et al. | 210/500.23 |
| 4,214,994 | 7/1980 | Kitano et al. | 210/490 |
| 4,806,245 | 2/1989 | Böddeker | 210/195.2 |
| 5,051,182 | 9/1991 | Wang et al. | 210/500.27 |

FOREIGN PATENT DOCUMENTS

| | | |
|---|---|---|
| 264113 | 10/1987 | European Pat. Off. . |
| 89089979 | 1/1990 | Fed. Rep. of Germany . |
| 2336962 | 12/1976 | France . |
| 2425876 | 5/1978 | France . |

*Primary Examiner*—Robert A. Dawson
*Assistant Examiner*—Ana M. Fortuna
*Attorney, Agent, or Firm*—Robert W. Becker & Associates

[57] ABSTRACT

A membrane for the separation of liquid mixtures by pervaporation has two surfaces, a first one representing a feed side and a second one representing a permeate side. The membrane is comprised of a swellable elastomeric polymer material and a reinforcing support embedded essentially parallel to the membrane surfaces in the polymer material. The reinforcing support is a woven mesh arranged asymmetrically so that the reinforcing support is adjacent to the permeate side.

12 Claims, 4 Drawing Sheets

MEMBRANE FOR THE SEPARATION OF LIQUID MIXTURES BY PERVAPORATION

BACKGROUND OF THE INVENTION

The invention relates to a membrane for the separation of liquid mixtures according to the pervaporation principle whereby the membrane consists of a swellable elastomeric polymer or polymer blend (polymer material) in which is incorporated a membrane-stabilizing, respectively reinforcing support that is essentially parallel to the membrane surface, the membrane having a feed side and a permeate side.

A membrane of the aforementioned kind has been known from U.S. Pat. No. 3,770,567. This known membrane is a so-called ion exchange membrane, i.e., with this known membrane the separation of the liquid mixture is effected according to the electrodialysis principle. This known ion exchange membrane is provided with a support material so that it may withstand greater pressures of the liquid mixture to be separated than unsupported membranes. A complete inclusion of fabric fibers of the support into the polymer material is thereby an essential condition for a structural reinforcement of the membrane without any imperfections whereby the polymer material may be thinner locally than corresponds to the fabric layer. The linear expansion due to swelling of the known ion exchange membrane is reduced from 14 to 17% (without support) to 3% when the fabric-type support is employed.

However, in membranes with which a separation of liquid mixtures according to the principle of pervaporation is carried out, the liquid mixture to be separated is fed to the membrane in a cross flow mode, whereas the permeate exiting from the membrane is removed in the form of vapors either by applying a vacuum to the backside (permeate side) of the membrane or with the aid of a circulating carrier gas stream. The separation of the mixture components is achieved due to their different membrane permeability and may be performed even against the ratio of vapor pressures, i.e., favoring the less volatile component. The membrane permeability is composed of the sorption of the liquid feed mixture into the membrane, the diffusion through the membrane, and the desorption at the backside of the membrane into the permeate vapor compartment. The sorption, in this context, has the greatest impact on the separation efficiency, i.e., the separation depends primarily on the preferred sorption of one component of the mixture relative to the other or others by the polymer membrane. The liquid sorption by the polymer membrane is associated with swelling of the membrane. The membrane swelling, which increases with the concentration of the preferentially permeating component in the feed mixture, is described by the so-called sorption isotherms, which, in the simplest case, predict a linear increase of the degree of swelling depending on the feed concentration.

A preferred application of the membrane separation by pervaporation is the separation of aqueous-organic liquid mixtures. In particular, aqueous-organic liquid mixtures comprised of water containing a relatively minor amount of organic components, are widely encountered as organically laden waste waters and as process effluents in biotechnology. The separation of such mixtures with the selective removal of the minor amounts of organics is performed by pervaporation via membranes of elastomeric polymers (polymer material) such as, for example, silicone rubber (polydimethylsiloxane), polyurethane, or polyether-polyamide-copolymers. In contrast to evaporation, pervaporation allows the selective removal of organic compounds having a considerably higher boiling point than water from water.

A prerequisite for a favorable separation effect, expressed as the enrichment of the organic component in the permeate in connection with its depletion (removal) in the retentate, is the selective sorption capacity of the membrane polymer for the organic component of the mixture, which is manifested by swelling. Elastomeric polymers have an especially strong swelling tendency which, in itself, is a condition for the desired separation effect. In summarizing the above, it may be said that with elastic membranes of a polymer, respectively, a polymer blend, employed according to the principle of pervaporation, a hindrance of the swelling would also result in a reduction of the sorption capacity of the membrane for the components to be pervaporated, resulting, in return, in a reduction of the separation effect of the membrane.

In the aforementioned ion exchange membrane according to the principle of electrodialysis (U.S. Pat. No. 3,770,567), the membranes are embodied relatively thick which is basically disadvantageous for a mixture separation according to the principle of electrodialysis. For this reason, the known ion exchange membrane was provided with a fabric reinforcement for the aforementioned reasons of improved handling properties and the desired greater pressure stability in order to counteract the membrane swelling. In the known ion exchange membrane the aforementioned measures reduced the swelling from between 14 to 17% to 3% which is exactly contrary to the objective to be realized by this invention.

It is an object of the present invention to provide a membrane for the separation of liquid mixtures which yields freely to the swelling pressure due to pervaporation without resulting in substantial changes to the surface area dimensions of the membrane, whereby the membrane is able to withstand high concentrations of swelling-inducing components in the water as well as operational changes of the swelling stage, whereby no foreign resistance counteracts the removal of the permeate vapors from the membrane, and whereby the flux through the membrane, relative to conventional membranes, is increased and the selectivity of the membrane is improved. Furthermore, the membrane shell may be manufactured according to conventional manufacturing methods for known membranes so that they may be produced in a simple and inexpensive way.

SUMMARY OF THE INVENTION

The object of the present invention is solved by providing a support in the form of a woven mesh for the separation of liquid mixtures according to the principle of pervaporation, which is, in the direction of passage of the mixture through the membrane, arranged asymmetrically such as to be shifted to the permeate side.

The advantage of the inventive membrane is essentially that it is basically a membrane formed of a homogenous polymer film in which however a woven mesh is embedded which is asymmetrically shifted to the permeate side. When performing a separation of a mixture according to the principle of pervaporation, the feed side of the membrane is the side which faces the liquid mixture, respectively, the feed mixture, while the permeate side of the membrane is actually the side which is reinforced by the woven mesh and which is exposed to the vacuum generated by pumping off the permeate vapors at the permeate side of the membrane. Due to the swelling of the polymer of the inventive membrane, the flux and the selectivity, with respect to membranes of an identical equivalent thickness having no woven mesh, are significantly increased (flux, respectively, flux density in $g/m^2 \times h$). The equivalent thickness is defined as the membrane thickness which corresponds to the same amount of polymer per surface area without the woven mesh.

According to a preferred embodiment of the invention the swelling will occur essentially in the area of the feed side of the membrane which borders the support, respectively, the woven mesh. Relative to the total cross-section of the membrane, an anisotropic swelling stage of the membrane is observed. In this respect, the swelling at the feed side reaches its maximum while the permeate side of the membrane is essentially free of any swelling. It is essential and advantageous for the present invention that the woven mesh present at the permeate side of the membrane, which is essentially free of any swelling, does not influence the swelling stage of the membrane. However, it prevents advantageously a longitudinal expansion of the membrane which generally occurs due to the membrane swelling at the feed side.

In an advantageous embodiment of the invention the degree of swelling is continuously reduced from the feed side to the permeate side whereby, as mentioned before, a degree of swelling is preferably zero at the permeate side of the membrane.

It has been shown that membranes having at least an equivalent thickness between $5 \times 10^{-2}$ and $2 \times 10^{-1}$ mm, which furthermore may be manufactured conventionally according to known casting processes for unreinforced membranes (without woven mesh), have advantageously high flux properties and a high selectivity.

The mesh-type support is preferably made from plastic fabrics, for example, a polyester fabric. However, it is also possible to form the mesh-type support in an advantageous manner from a metal mesh, whereby it is also conceivable to provide the mesh-type support as a combination of a plastic and a metal mesh.

In a preferred woven mesh of the membrane the thickness of the fibers is approximately $2.5 \times 10^{-2}$ to $10^{-2}$ mm and is comprised of a polyester monofilament.

In general, the membrane may be formed in any desired suitable manner, i.e., preferably it may be in the form of a flat sheet membrane suitable for incorporation into membrane modules whereby, with respect to its properties, it corresponds essentially to the properties of non-swollen polymer films. However, it is also possible, according to another advantageous embodiment, to provide the membrane as a tube or tubular membrane and it may then be used in apparatus employing tubular membranes of the non-swollen kind.

With membranes embodied in a tubular shape the outer side of the membrane or, depending on the application, the inner side of the membrane may be the permeate side, i.e., the respective selected side is asymmetrically provided, relative to the membrane cross-section, with the support, respectively, the woven mesh.

BRIEF DESCRIPTION OF THE DRAWINGS

The invention will now be described with the aid of the only schematic drawing and a plurality of diagrams with respect to one embodiment. It is shown in.

DESCRIPTION OF PREFERRED EMBODIMENTS

Figure 1:
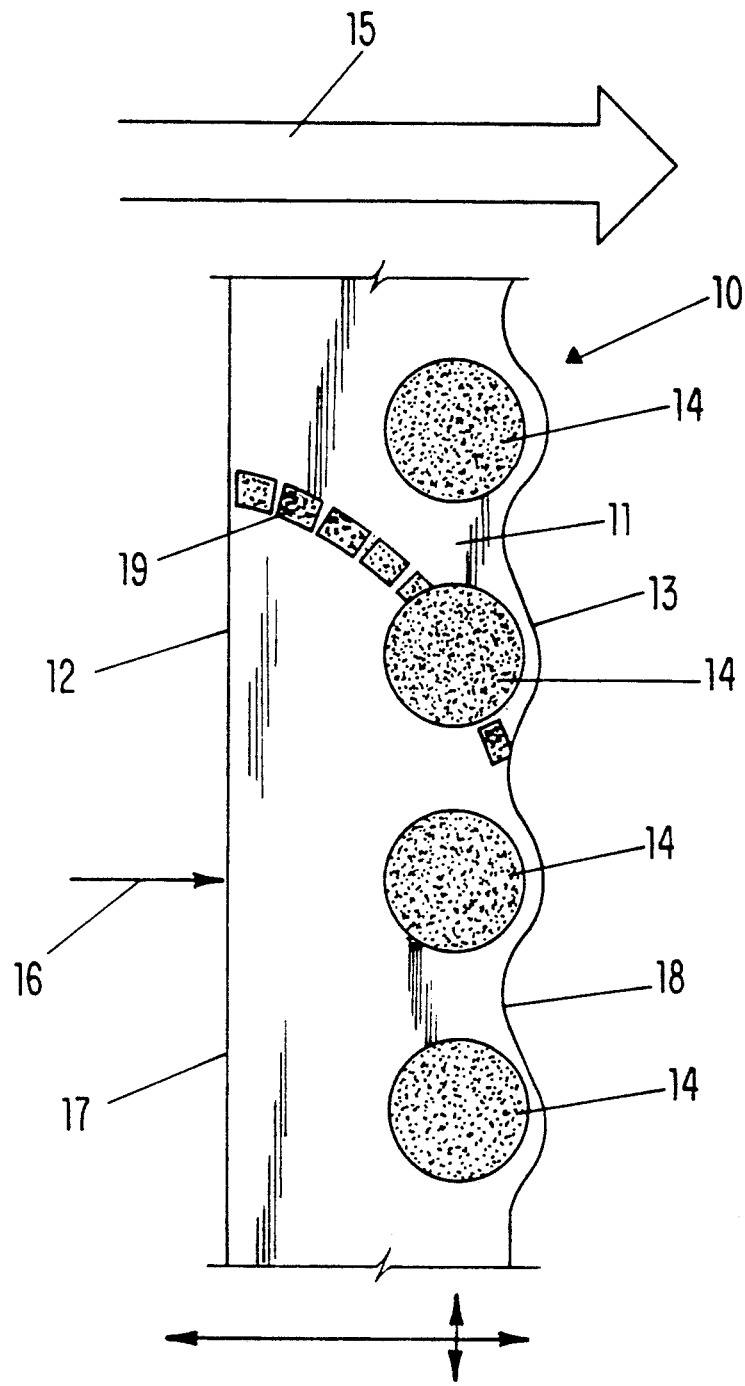
FIG. 1 a view of the cross-section of the membrane and schematically the size of the membrane swelling vector of the respective swelling.
Figure 2:
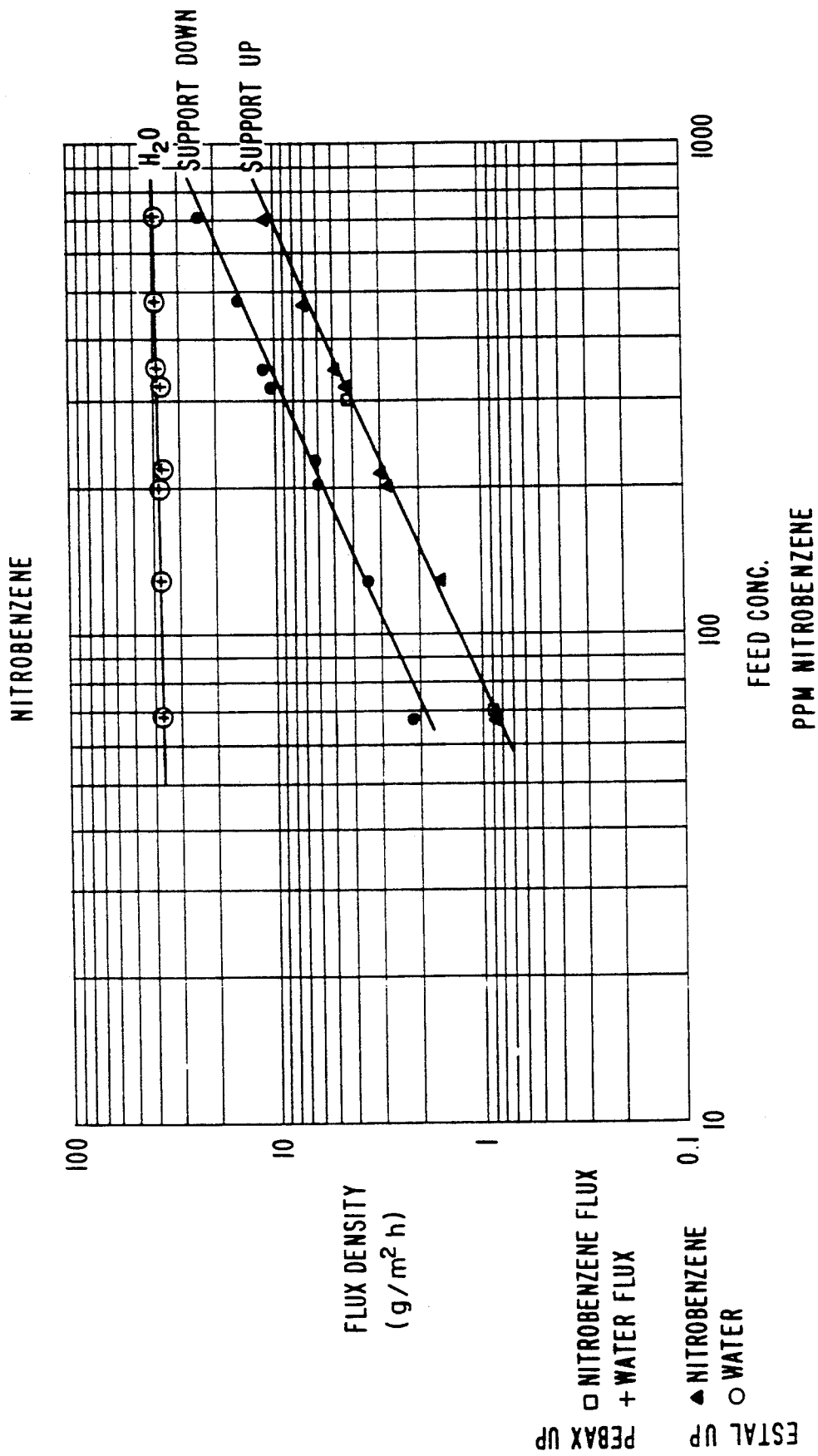
FIG. 2 shows the flux of nitrobenzene and water through an inventive membrane as a function of the feed concentration, whereby the mixture is fed to the feed side (support down) and to the permeate side (support up)
Figure 3:
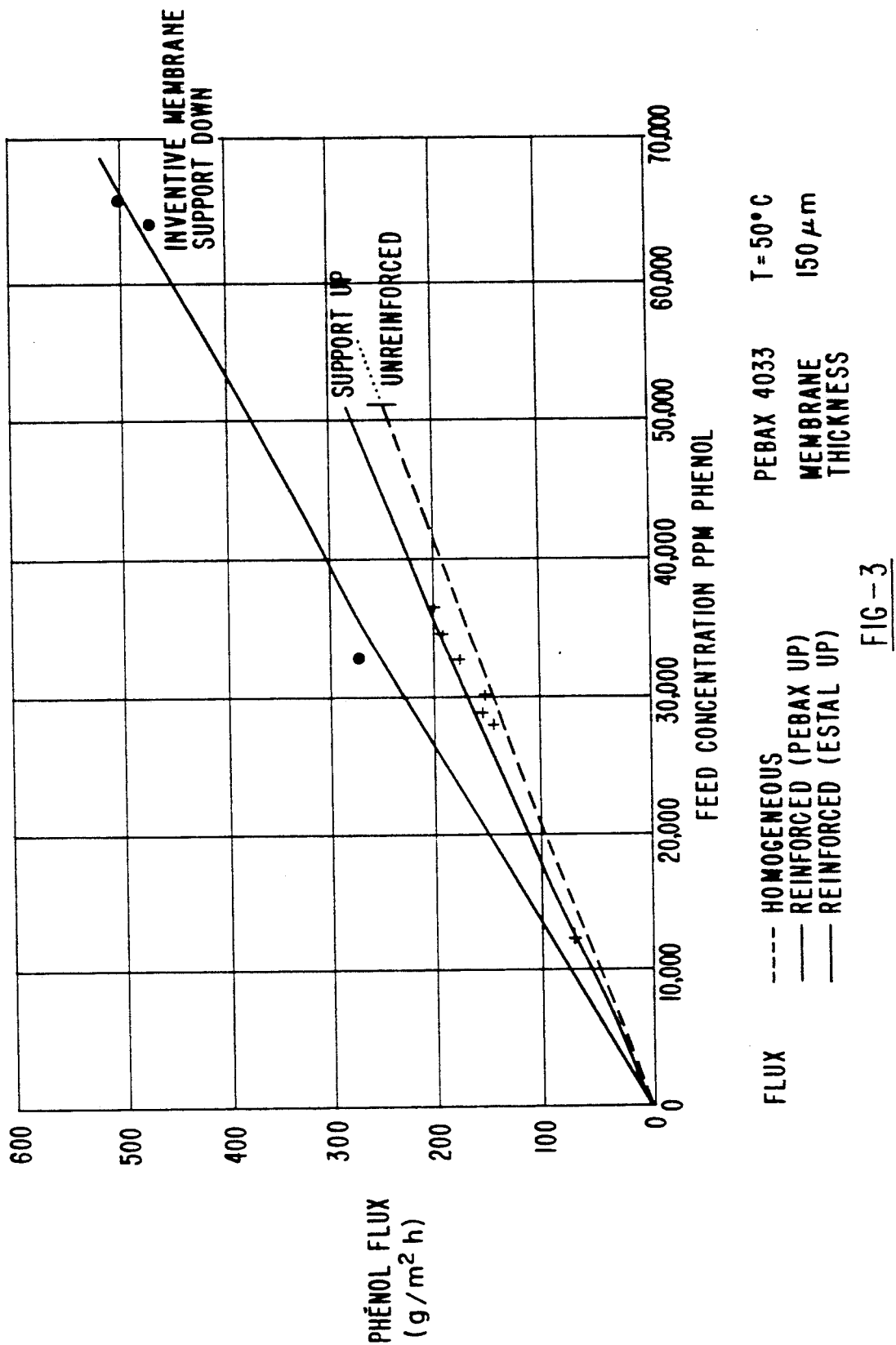
FIG. 3 shows the flux of phenol through an inventive membrane as a function of the feed concentration, whereby the mixture is fed to the feed side (support down) and to the permeate side (support up) as well as to a membrane without support.

The membrane 10 is comprised essentially of a polymer 11 into which a support 14, in the form of a woven mesh, is asymmetrically embedded with respect to the cross-section. The asymmetric arrangement of the support 14 within the membrane, respectively, within the polymer 11 forming the membrane 10 is such that the support 14 is shifted toward the permeate side 18, compare FIG. 1. One of the membrane surfaces 12 represents the feed side, i.e., the side to which the mixture to be separated is fed, while the other membrane surface 13 represents the permeate side 18 where the permeate vapors corresponding to the mixture 16 passing through the membrane 10 in the direction of passage 15 is removed by a vacuum.

The two arrows which are shown below the membrane extending in a transverse and longitudinal direction correspond to the swelling vectors and represent the order of magnitude of the degree of swelling of the polymer 11 at the membrane surface and in the transverse direction of the membrane. The represented membrane exhibits a maximum swelling of the polymer 11 at the feed side 17 and exhibits practically no swelling at the permeate side 18. The intermediate stages of the degree of swelling of the membrane 10 are represented in FIG. 1 as the dotted profile line 19. The woven mesh 14 which is arranged at the permeate side of the membrane 10 which is essentially not swollen does not influence the swelling stage of the membrane 10 in this area. However, it prevents a longitudinal expansion of the membrane usually resulting from the membrane swelling at the feed side which now may only occur in the transverse direction, i.e., in the form of a thickening of the membrane. This is represented by the aforementioned swelling vectors with respect to the linear expansion directions of the membrane 10 under pervaporation conditions.

For the manufacture of the membrane 10 with the asymmetrically embedded woven mesh 14 basically the same relatively simple methods used for the manufacture of homogeneous polymer films may be applied, i.e., the manufacture from casting solutions with volatile solvents or from a polymer melt. When comparing the effectiveness of membranes, the thickening of the membrane 10, resulting from the incorporation of the woven mesh 14, relative to unreinforced polymer membranes is accounted for by providing an equal amount of polymer per surface area unit.

Important characteristics of the membrane 10 may be taken from the following examples. The polymer membrane is made from a polyether-polyamide-block copolymer, available under the trade name Pebax 4033 and manufactured by Atochem, Paris, which has been proven to be especially suitable for the pervaporation of high boiling organics, especially of phenols, from water. A preferred woven mesh is comprised of a polyester monofilament having a fiber thickness of, for example, $8.5 \times 10^{-2}$ mm, available under the trade name Estal and manufactured by Schweiz. Seidengazefabrik, Thal. Various membranes of an equivalent thickness between $10 \times 7^{-2}$ and $1.5 \times 10^{-1}$ mm corresponding to a structural thickness between $2.2 \times 10^{-1}$ and $3.1 \times 10^{-1}$ mm were provided with an asymmetric support, respectively, woven mesh 14 embedded in the membrane 10 and manufactured by a casting process. The pervaporation experiments were carried out in an aqueous phenol solution of a concentration range of 100 to 50,000 ppm (5%) phenol at 50° C. The following membranes were employed.

- I: Homogeneous polymer film without woven mesh having a thickness of $1.5 \times 10^{-1}$ mm; this thickness corresponds to the equivalent thickness of the woven mesh membranes.
- II: Polymer film with asymmetrically integrated polyester woven mesh of a structural thickness $3.1 \times 10^{-1}$ mm, equivalent thickness 150—, in the inventive arrangement corresponding to FIG. 1.
- III: Polymer film of the above description, however having the opposite arrangement, i.e. the woven mesh reinforcement is at the feed side.

EXAMPLE 1

Diluted solutions (100 to 1,000 ppm phenol in the feed). The following experimental results with respect to flux (flux density in g/m²h) and selectivity (enrichment factor for phenol) were observed for the three membranes:

| Feed | Membrane I | | Membrane II | | Membrane III | |
|---|---|---|---|---|---|---|
| Concentr. | Flux | Select. | Flux | Select. | Flux | Select. |
| 100 ppm | 34 | 192 | 36 | 194 | 36 | 139 |
| 1000 ppm | 42 | 143 | 46 | 152 | 42 | 120 |

It can be taken from this example that for diluted feed solutions and correspondingly low membrane swelling the unreinforced (I) and the inventively laterally reinforced membrane (II) have comparable pervaporation performance. However, since the reinforced membrane of an identical polymer amount with respect to the surface area is respectively thicker than the unreinforced comparative membrane the comparable pervaporation performance may be considered an advantage of the inventive membrane. The asymmetric swelling behavior under pervaporation conditions presumed by the present invention is confirmed by the comparison of the two arrangements of the asymmetrically reinforced membrane. When the woven mesh reinforced membrane side is facing the feed (III), the selectivity under identical conditions is significantly reduced with respect to the inventively applied membrane (II). The disadvantageous hindrance of the membrane swelling at the feed side is immediately recognized as the reduced sorption capacity of the membrane for the component of the mixture to be separated, for example, phenol. However, when the swelling capacity is maintained, as is intended with the present invention, then the woven mesh reinforcement is no hindrance.

EXAMPLE 2

Concentrated solutions (10,000 to 50,000 ppm phenol in the feed). With the three membranes the following test results were observed.

| Feed | Membrane I | | Membrane II | | Membrane III | |
|---|---|---|---|---|---|---|
| Concentr. | Flux | Select. | Flux | Select. | Flux | Select. |
| 10000 ppm | 92 | 54 | 137 | 53 | 105 | 52 |
| 20000 ppm | 143 | 35 | 214 | 35 | 158 | 38 |
| 30000 ppm | 195 | 26 | 300 | 26 | 216 | 26 |
| 40000 ppm | 238 | 20 | 377 | 20 | 285 | 20 |

High concentrations of the organic component in the feed result in a high membrane swelling with a respective loss of mechanical stability. The stabilizing (reinforcing) influence of the woven mesh is expressed in the fact that under the conditions of the above example the unreinforced membrane (I) is not stable when the concentration of phenol in the feed is 50,000 ppm, while the reinforced membrane (II) retained its integrity over the duration of the experiment. With respect to the pervaporation performance the test results show that the woven mesh reinforcement in general increases the flux rate of the membrane without reducing the selectivity; at a sufficiently high membrane swelling the flux enhancement thus pertains equally to all components of the feed mixture, i.e., phenol and water. The comparison of the two arrangements of the asymmetrically reinforced membrane (II and III) not only shows the advantage with respect to the inventive configuration (II), but also that it represents a considerable improvement with respect to the unreinforced comparative membrane (I).

Figure 4:
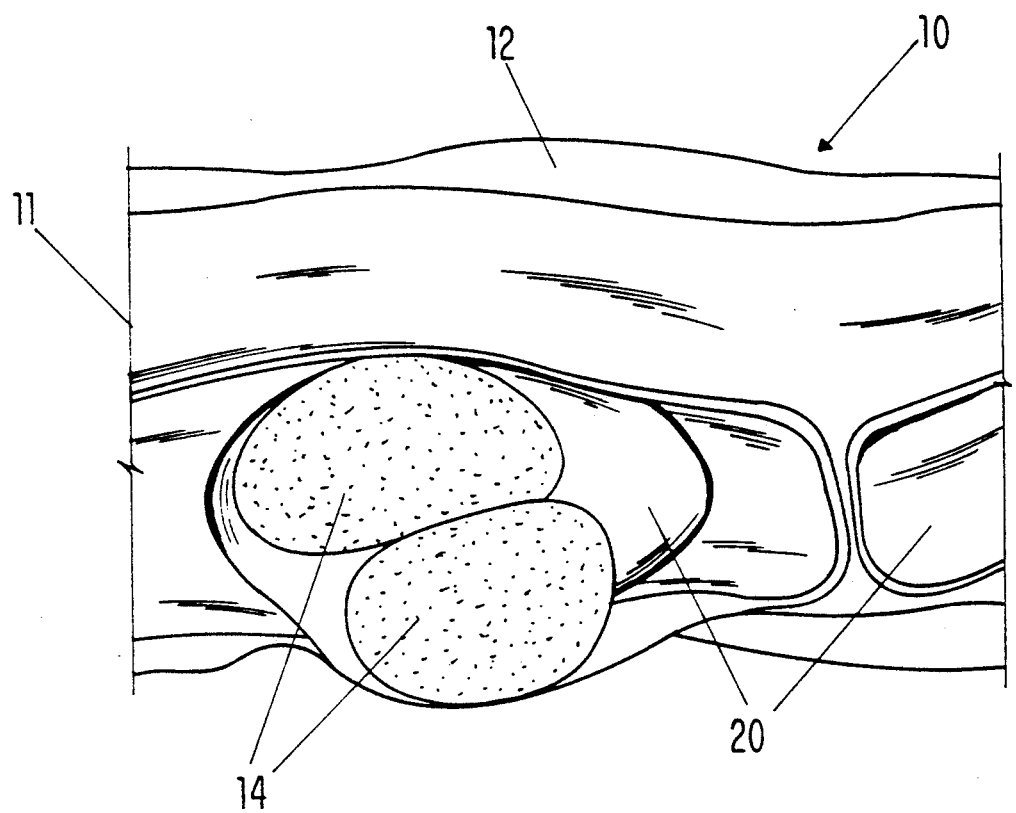
FIG. 4 shows a cross-sectional view of a membrane based on an electron microscope photograph, from which it can be taken that the mesh-type support is not in contact with the polymer forming the membrane.

With respect to FIG. 4 it will be noticed that, after the manufacture of the membrane 10, the woven mesh-type support 14 is practically not contacted by the polymer 11 of the membrane 10. A cavity system 20 is shown in the area of the woven mesh-type support 14 which is not contacted by the polymer 11. This results in an increase of the surface area (desorption area) of the permeate side 18 and thus, by definition, an increase of the flux density of the membrane 10.

The present invention is, of course, in no way restricted to the specific disclosure of the specification and drawings, but also encompasses any modifications within the scope of the appended claims.

What we claim is:

1. A membrane for the separation of liquid mixtures by pervaporation, said membrane having two surfaces, a first one of said surfaces representing a feed side and a second one of said surfaces representing a permeate side, said membrane being comprised of a swellable elastomeric polymer material and a reinforcing support embedded essentially parallel to said membrane surfaces in said polymer material, said reinforcing support being a woven mesh arranged asymmetrically so that said reinforcing support is adjacent to said permeate side.

2. A membrane according to claim 1, wherein said polymer material swells essentially in the area defined between said feed side and said reinforcing support.

3. A membrane according to claim 2, wherein a degree of swelling of said polymer material continuously decreases from said feed side toward said permeate side.

4. A membrane according to claim 3, wherein said degree of swelling approaches 0 at said permeate side.

5. A membrane according to claim 1, wherein said membrane has at least an equivalent thickness of between $5 \times 10^{-2}$ to $2 \times 10^{-1}$ mm.

6. A membrane according to claim 1, wherein said reinforcing support is a polyester fabric.

7. A membrane according to claim 1, wherein said reinforcing support is a metal mesh.

8. A membrane according to claim 1, wherein said reinforcing support has a fiber thickness of $2.5 \times 10^{-2}$ to $2 \times 10^{-2}$ 9. A membrane according to claim 1, wherein said membrane is a flat sheet membrane.

10. A membrane according to claim 1, wherein said membrane is a tubular membrane.

11. A membrane according to claim 10, wherein said permeate side is arranged on an outer side of said tubular membrane.

12. A membrane according to claim 10, wherein said permeate side is arranged on an inner side of said tubular membrane.

* * * * *